United States Patent
Fellgett et al.

[15] 3,669,207
[45] June 13, 1972

[54] VEHICLE GUIDANCE SYSTEMS

[72] Inventors: Peter Berners Fellgett; George Robert Whitfield, both of Reading, England

[73] Assignee: International Harvester Company of Great Britain Limited, London, England

[22] Filed: Oct. 13, 1969

[21] Appl. No.: 865,930

[30]     Foreign Application Priority Data

Oct. 16, 1968   Great Britain......................49,136/68

[52] U.S. Cl..............................180/98, 180/79.1, 318/563,
                                       318/587, 318/608, 340/248
[51] Int. Cl.......................................................B60k 27/06
[58] Field of Search....................180/98, 79.1, 79; 340/213,
                          340/248; 318/563, 580, 581, 587, 608

[56]           References Cited

UNITED STATES PATENTS

| | | | |
|---|---|---|---|
| 3,198,279 | 8/1965 | Quinn | 180/98 X |
| 3,556,244 | 1/1971 | Gray | 180/98 |
| 2,750,583 | 6/1956 | McCullough | 180/79.1 |
| 2,859,426 | 11/1958 | Davis | 180/79.1 X |
| 2,999,938 | 9/1961 | Hann et al. | 180/98 UX |
| 3,095,783 | 7/1963 | Flindt | 340/248 X |
| 3,235,024 | 2/1966 | Barrett, Jr. | 180/98 X |
| 3,275,975 | 9/1966 | King | 180/98 |
| 3,468,391 | 9/1969 | Rushing et al. | 180/98 |
| 3,484,770 | 12/1969 | Cheeseman | 340/213 |

Primary Examiner—Benjamin Hersh
Assistant Examiner—John P. Silverstrim
Attorney—Floyd B. Harman

[57]          ABSTRACT

A system for guiding a vehicle under control of a guide member enables the vehicle to be guided in a path which may be immediately above or offset from the guide member. The position of the vehicle in relation to the guide member is uniquely determined by receiving signals in two different ways having strengths of interaction which vary differently with distance from the guide member. The nature of the system enables a warning to be given immediately upon any malfunction in a part of the system.

8 Claims, 4 Drawing Figures

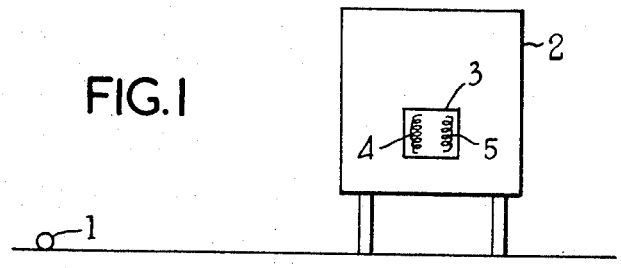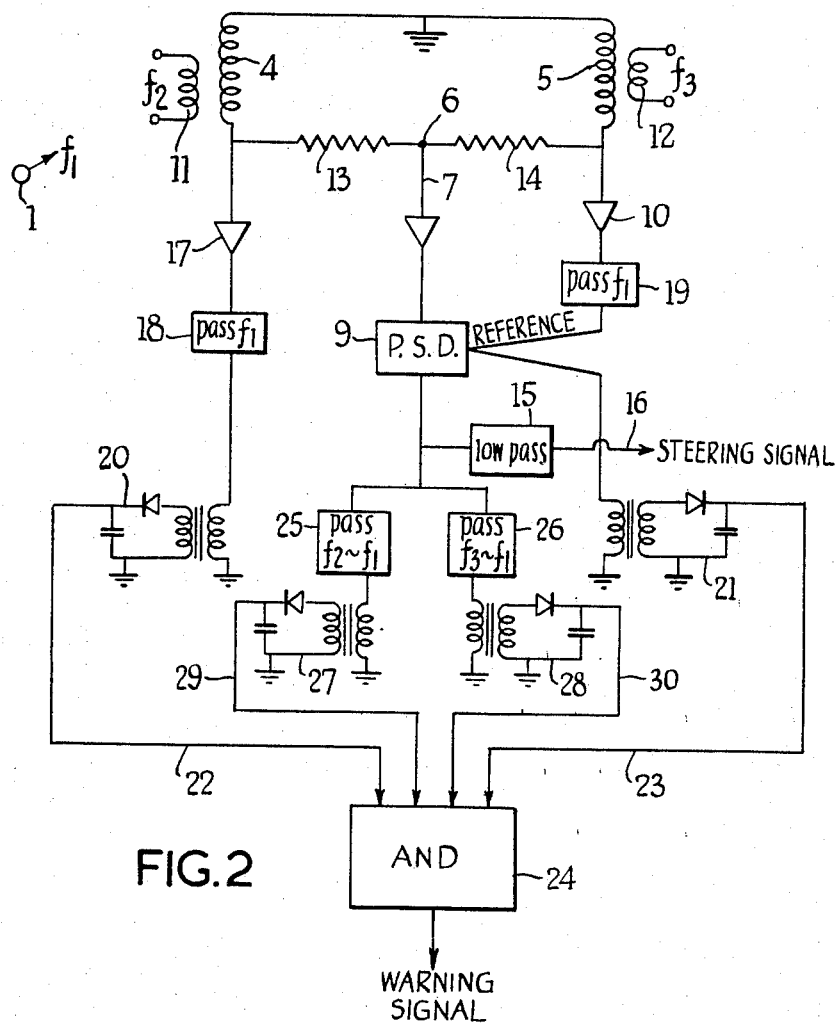

INVENTORS
PETER BERNERS FELLGETT
GEORGE ROBERT WHITFIELD

VEHICLE GUIDANCE SYSTEMS

This invention relates to vehicle guidance systems for use in guiding a vehicle along a predetermined path. The vehicle guidance system may incorporate a steering servo mechanism for actually controlling the steering of the vehicle to follow the predetermined path, or, alternatively, the vehicle guidance system may simply produce a guide signal indicative of the relationship of the vehicle to the predetermined path and an operator may then use this guide signal for steering the vehicle along the predetermined path.

According to the present invention there is provided a system for guiding a vehicle in a desired path relative to a guide member in which the guide member emits one or more guide signals capable of interacting with reception means on the vehicle in at least two ways having strengths of interaction which vary differently with distance from the guide member, and the strengths of signals received in these two different ways of interaction are compared to derive a steering signal which indicates uniquely the relationship of the reception means to the guide member. Preferably the comparison of the signals received in the two different ways of interaction are compared on the vehicle, although it is within the scope of the invention for the comparison to be effected on the ground and for the result to be relayed to the vehicle, for example by radio.

The desired path along which the vehicle is to be guided may be a path directly above the guide member and such a system is applicable to the guidance of aircraft, boats and air cushion vehicles, as well as the guidance of land vehicles.

Another particular application of the present invention lies in the guidance of vehicles, particularly land vehicles, along paths which are generally parallel to, but may be offset from, a guide member, and may be at a different level from, as well as offset from, the guide member. In those circumstances it may be said that the desired path is laterally offset a predetermined distance from the guide member. This statement comprehends the case of the vehicle which is guided along a path offset from a buried guide member as well as the case when a road vehicle is guided along a predetermined distance from the side of the road under the control of a guide member laid along the side of the road.

It is to be clearly understood, however, that the flexibility of the system in accordance with the present invention is such that the predetermined distance by which the path is laterally offset may be zero. The zero offset is therefore simply a special case of the operation of the system of the present invention which has the advantage over some previously known systems which have to be specially modified if the desired path is changed from a particular offset to zero offset or vice versa.

A further possibility within the scope of the present invention is that two guide wires could be used to define a path in three dimensions for an aircraft.

The flexibility which is afforded by the present invention is such as to enable the vehicle to follow paths offset different distances from one guide member, and a particular application for the invention in these circumstances is the control of a tractor performing an agricultural function in a field along a number of parallel paths offset different distances from a guide member laid, for example, either in the hedge enclosing the field or buried somewhere within the field.

Another particular application of the invention is to the guidance of motorcars, urban passenger vehicles, vehicles used for handling goods or materials is factories, etc., especially where vehicles are required to follow in a safe manner a series of substantially parallel paths in order to avoid incompatibility in speed or direction.

In a system in accordance with the present invention in which the control signals are capable of interacting with reception means on the vehicle in at least two different ways it may be said that either the guide member or the reception means must be complex. The term "complex" as used in this context imparts particular meaning to the guide member or the reception means as will now be explained.

When the guide member is complex, it emits simultaneously or in rapid succession signals by means of different mechanisms of emission which give rise to different laws of variation of strength of emitted signal with distance from the guide member. Such different mechanisms of emission from a complex guide member are, for example, monopole (that is to say unbalanced to earth) electric or magnetic fields, dipole electric or magnetic fields, quadrupole electric or magnetic fields and electric or magnetic fields emitted by systems employing still higher numbers of poles. The present invention is not limited, however, to the use of electric or magnetic signals, and, for example, the emitted signals may be acoustic signals.

When the reception means is complex, it responds simultaneously or in rapid succession to different characteristics of the guide signal, which characteristics are such that the law of strength of reception of the signal varies in a different manner with distance from the guide member for each characteristic. The characteristics of the guide signal which are employed and which have different laws of strength of reception with distance may, for example, be the total strength of an electric or magnetic field, the strengths of vector components of an electric or magnetic field in prescribed directions, or the gradients or higher gradients in prescribed directions of the said total or vector strengths.

According to the principle of physical reciprocity there is no essential difference between, on the one hand, emission of a complex guide signal, for example by the different mechanisms referred to above, and, on the other hand, complex reception involving reception of characteristics having strengths which vary in different manner with distance from the guide means by a complex reception means. To this extent it does not matter whether the guide member or reception means or both are complex, but in practice it will usually be more economical to make the guide member simple and the reception means complex.

According to this aspect of the present invention therefore there is provided a system for guiding a vehicle in a desired path relative to a guide member comprising a guide member, emitter means for causing the guide member to emit one or more guide signals, reception means on the vehicle, at least one of the emitter means and the reception means being complex so that signals may be received on the vehicle in at least two different ways having strengths of interaction which vary differently with distance from the guide member, and means on the vehicle for deriving, from a comparison of the strengths of signals received in these two different ways of interaction, a steering signal which indicates uniquely the relationship of the reception means to the guide member.

The most practicable arrangement in accordance with the present invention is one in which the reception means on the vehicle is complex in the sense described. Accordingly there is provided in accordance with the present invention a system for guiding a vehicle in a desired path a predetermined distance from a guide member in which the guide member emits a single guide signal capable of interacting with reception means on the vehicle in at least two different ways, and a complex reception means is used to derive from a plurality of those guide signal characteristics which have different laws of variation of strength of the guide signal characteristic with distance from the guide member, a steering signal which indicates uniquely the relationship of the complex reception means on the vehicle to the guide member.

More particularly in accordance with the embodiment of the invention which will be described there is provided a system for guiding a vehicle in a desired path laterally offset a predetermined distance from a guide member, means for causing the guide member to emit an electromagnetic guide signal, and complex reception means on the vehicle for detecting two characteristics of the electromagnetic field which vary in different manner with distance from the guide member, and for utilizing the strengths of the detected signals to derive a steering signal which indicates uniquely the relationship of the complex reception means on the vehicle to the desired offset path.

The concept of the present invention in its broadest aspect, which is based on the use of two field characteristics to indicate the position of the vehicle in relation to the desired path, is inherently capable of operating in an entirely fail-safe manner. Therefore, in accordance with a preferred feature of the invention means is provided for recognizing immediately any malfunction of the system and giving a warning so that the vehicle can be brought to rest or otherwise controlled instead of being caused to follow an incorrect path with consequent danger of collision or other accident. This is because, in the system in accordance with the present invention, failure of the guide signal or failure of the reception means, including malfunction either of the reception means itself or of comparison means to which the signals may be fed for utilization, are logically distinguishable from signals which arise when the vehicle is in any possible relationship to the guide member.

The warning which is given may be simply a visible or audible warning, or it may be the application of the brakes or the disconnection of the engine so that the vehicle is automatically stopped.

Particularly in accordance with the present invention there is provided, in or for a system for guiding a vehicle in a desired path relative to a guide member which emits a guide signal having an accompanying field, a vehicle having reception means including means for detecting the strength of the field and the strength of a gradient of the field at the vehicle, and means for deriving from the detected signals a steering signal indicative of the relationship of the vehicle to the guide member. Preferably a further signal indicative of the continuing operation of the essential apparatus for producing the steering signal is also derived from the detected signals.

The present invention also comprehends, in or for a system for guiding a vehicle in a desired path relative to a guide member which emits a guide signal, a vehicle having reception means which detects a plurality of the guide signal field characteristics which vary in different manner with distance from the guide member, and which derives from the detected guide signal field characteristics two output signals, of which one is the sum or difference between the strengths of a pair of said characteristics or signals based thereon (for example proportions of the strengths of the pair of characteristics), and the other corresponds to the strength of the guide signal in a given direction at the vehicle, the one signal being a steering signal indicative of the relationship of the vehicle to the desired guide path and the presence of the other signal indicating that there is no malfunction in either the whole system or selected items thereof.

Advantageously the said one signal is fed to a steering servo mechanism for controlling the steering of the vehicle substantially along the desired guide path. Desirably the absence of the said other signal causes warning to be given in an unambiguous manner, such as by the application of the brakes of the vehicle, that there is a malfunction in at least a part of the system.

In the preferred embodiments of the invention which are to be described an electromagnetic guide signal is emitted by a guide member such as a leader cable, and characteristics of the electromagnetic guide signal capable of interacting with reception means on the vehicle in at least two different ways are received by a complex sensor.

In one embodiment the complex sensor comprises only passive elements, such as coils, capacitors, resistors, etc., while in another embodiment it additionally includes active elements such as amplifying devices, switches, phase-sensitive detectors, etc. However, in either case the complex sensor possesses terminals or other means for giving out a steering signal which is unambiguously indicative of the vector or scalar deviation from a prescribed value of the distance of the sensor from the guide member, such indication being substantially unaffected by variations in the strength of the signal emitted from the guide member. In the preferred embodiments in which the fail-safe facility of the invention is to be exploited, the complex sensor additionally has another set or sets of terminals or other means of giving out a signal indicative of the strength of the signal emitted from the guide member, or indicative of the correct functioning of the various components of the complex sensor in a manner which will be described further.

In the specific embodiments of the present invention which are to be described a first one of the output signals available from the complex sensor corresponds to the strength of the magnetic field of the guide signal at the vehicle resolved along a given direction defined by the mean magnetic axis of the coils. The second of the output signals available from the complex sensor is the sum or difference between a proportion of this magnetic field strength and at least a proportion of the spacial gradient of the magnetic field strength along a prescribed direction. In the case of a ground vehicle the prescribed direction in which the spacial gradient is detected is normally the horizontal direction.

In general the second output signal from the complex sensor is arranged to be zero when the vehicle is on a desired guide path. The system is such that the desired guide path may be offset from the guide member or leader cable and, when the desired guide path is an offset path, the amount which the guide path is offset from the guide member or leader cable is determined by the proportions of the magnetic field strength and the spacial gradient thereof which are taken when deriving the second output signal in the manner described above. The condition of whether the vehicle is on the desired guide path or not is independent of the actual strength of the guide signal emitted from the leader cable and the overall strength of the guide signal present at the vehicle. This independence arises from the effective comparison, which is made in deriving the second output signal, between two measures based on the same magnetic field strength and therefore there can be no variation of the vehicle from the desired guide path as a consequence of a change in the strength of guide signal emitted from the leader cable, for example a change caused by an accidental variation in the generator feeding the emitter.

As a further explanation of the basic concept of the invention, the following consideration of the signals derived at the reception means is given. Suppose that the signal derived from one mechanism of interaction has the value $S.f(d)$ in which $S$ represents in suitable units the strength of the generator of the guide signal, and $f(d)$ is a mathematical function of the distance $d$ between the sensor and the guide member. Suppose further that the signal derived from a second mechanism of interaction in accordance with the invention has strength $S.g(d)$ in which $S$ has the same meaning as before and $g(d)$ is a different function of distance. Then, the mathematical forms of $f(d)$ and $g(d)$ being known, measurement of $S.f(d)$ and of $S.g(d)$ gives two simultaneous equations which may be solved for the two unknowns $S$ and $nd$, thus determining separately the distance and the strength of the signal and enabling any variation in the one to be distinguished from variation in the other. Preferably the sensor is arranged and adjusted in a manner to be further described so that one of its outputs is a signal $aS.F(d) + bS.g(d)$ in which $a$ and $b$ are positive or negative constants of proportionality chosen so that this signal equals zero for some prescribed value of $d$, this condition being evidently independent of the value of $S$ so long as $S$ is not itself zero (which would indicate failure of the system), and conveniently the prescribed value of $d$ is chosen to agree with the desired position of the vehicle. Therefore, by suitable choice of the constants of proportionality, $a$ and $b$, any desired distance $d$ of the sensor from the guide member may be chosen and the apparatus may be so constructed that $a$ and $b$ are variable, for example in accordance with a predetermined program, so that the vehicle carrying the sensor is caused to follow a series of paths which are offset different distances from the guide member.

The first output signal mentioned above, i.e. the signal which corresponds to the strength of the magnetic field of the guide signal at the vehicle resolved along the mean magnetic axis of the coils, is used, in effect, to indicate a malfunction in the system and to cause the vehicle to be brought to a halt immediately the first signal ceases to be present. This can be done because, when the vehicle is on the guide path and the second output signal is therefore zero, the first output signal indicates unambiguously the strength of the guide signal received at the vehicle. If a failure should occur in the system when the vehicle is not exactly on the guide path the deviation from the desired guide path is normally small enough for the first output signal still to indicate the strength of the guide signal.

The present invention therefore also comprehends a vehicle adapted to be guided along a predetermined path by guide signals emitted from a guide member, the vehicle comprising a complex sensor capable of deriving from the received guide signals a first output signal corresponding to the strength of the received guide signal and a second output signal which is derived from the strength of the received guide signal and the strength of a spacial gradient of the received guide signal, the second output signal being a steering signal indicative of the relationship of the vehicle to the predetermined path, and the absence of the first output signal being used to indicate a failure in either the transmission or reception of the guide signal.

In order that the present invention may be more clearly understood the following detailed description of some preferred embodiments thereof is made, by way of example, with reference to the accompanying drawings, in which:

FIG. 1 illustrates diagrammatically a vehicle having a complex reception means operating in accordance with the present invention to follow a desired path laterally offset from a leader cable;

FIG. 2 shows a system according to the invention including the complex reception means of FIG. 1 connected to a circuit arranged to give a guide signal for steering the vehicle and a warning signal for indicating any failure in the circuit;

In the drawings the same or similar parts are designated by like reference numerals.

Figure 3:
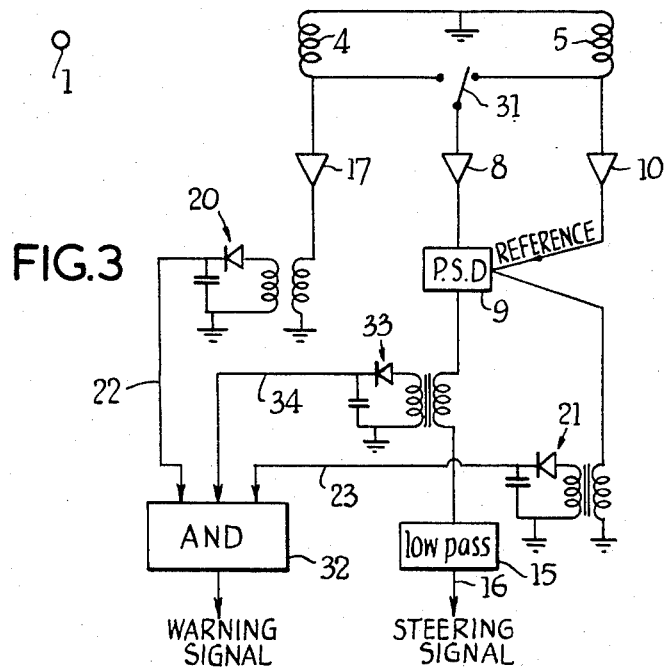
FIG. 3 shows an alternative system to that of FIG. 2, but still including the complex reception means of FIG. 1.

Referring first to FIG. 1, there is shown a leader cable which is capable of carrying an electromagnetic guide signal of a selected frequency $f_1$, and the leader cable 1 is laid on the ground to follow a path displaced a predetermined amount from the path which a vehicle 2 is to follow. The vehicle 2 carries a reception means 3 which is a complex reception means or sensor including magnetic field detector coils 4 and 5 from which both the sum and difference of their responses (or quantities mathematically equivalent to this sum and difference) are available, the former corresponding to the strength of the vector component parallel to the mean magnetic axis of the coils 4 and 5, and the latter corresponding approximately to the gradient of this vector component. If the coils 4 and 5 are wound with equal numbers of turns and connected in anti-phase so that the difference between their responses is obtained, there is a good approximation to the gradient of the magnetic field, but by altering the relative number of turns on the coils 4 and 5 an output can be obtained which is proportional to the algebraic sum of the field gradient and the field strength itself. Therefore, by choosing the relative number of turns on the coils 4 and 5, it can be arranged that the combined output signal from coils 4 and 5 is zero when the vehicle is on the desired path.

The use of a lesser number of turns on the magnetic coil 4 than is used on the coil 5 has the effect of giving the coil 4 which is nearer to the leader cable 1 a lesser response to a given magnetic field than the magnetic coil 5.

Figure 4:
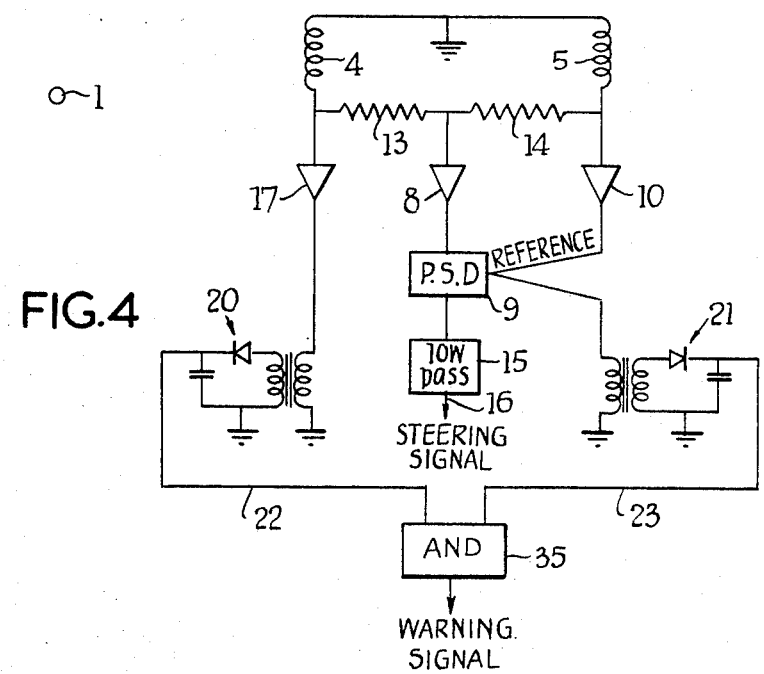
FIG. 4 shows a further system in accordance with the invention which is a simplified version of the system of FIG. 2.

The coils 4 and 5, or other reception means such as two capacitors, having similar relative responses to an electromagnetic guide signal, may be connected in any one of a number of alternative circuits for producing the actual steering signal and also for giving a warning signal to indicate the malfunction of any part of the receiver circuit or any failure in the transmitted signal. The circuit which is illustrated in FIG. 2 is one embodiment of a full circuit providing for a warning signal to be given if any component in the whole of the receiver circuit on the vehicle should fail. FIG. 3 is an alternative embodiment of a circuit which similarly gives warning in the event of the failure of any component, but it will be readily appreciated that some components are much more reliable than others, and consequently various simplified circuits may be devised where only the less reliable components are tested to see if they are still operating. Such a simplified circuit is shown in FIG. 4 which is in fact a simplified version of the circuit of FIG. 2.

Referring to FIG. 2, the coils 4 and 5 are shown connected together so that, in the position of the vehicle following a desired path offset a predetermined distance from the leader cable 1, the outputs of the coils 4 and 5 in response to reception of the electromagnetic signal of frequency $f_1$ are of equal amplitude but of opposite phase. In these circumstances there will be no output signal present at the point 6, but as soon as the vehicle departs from its desired offset path an output signal will appear at the point 6 to be passed along the line 7 through an amplifier 8 to a comparator device 9 which is a phase-sensitive detector, conveniently a phase-conscious rectifier.

The induced signal from the coil 5 is fed via an amplifier 10 and a filter 19 which passes the frequency $f_1$ of the guidance signal to the comparator device 9 as a reference signal which is constantly present.

The output signal which is produced at the point 6 is dependent on the gradient of the magnetic field extending between the positions occupied by the two coils 4 and 5. The output signal present at the point 6 is zero only when the coils 4 and 5 are offset the predetermined distance from the leader cable 1 which gives rise to a selected and unique gradient of the magnetic field.

A test signal of a frequency $f_2$ which is near to the frequency $f_1$ of the guide signal is injected into the coil 4 by a coil winding 11 associated with the coil 4, and similarly a test signal frequency $f_3$, also close to the frequency $f_1$ of the guide signal, is injected into the coil 5 by a coil winding 12.

Provided that the coils 4 and 5, resistors 13 and 14, which are included in the circuit with these coils, the line 7, the amplifier 8 and the comparator device 9 are all working properly, the output from the comparator device 9 will always include the difference signals of frequency $f_2 - f_1$ and $f_3 - f_1$. The output signal from the comparator device 9 will also include a steady component which is zero when the vehicle is following the desired offset path a predetermined distance from the leader cable 1. When the vehicle deviates from the desired offset path, the steady component of the output signal from the comparator device 9 adopts a sign dependent on the direction of deviation from the desired offset path. This steady or direct current component of the output signal from the comparator device 9 is passed via a lowpass filter 15 to an output line 16 as the steering signal which, as already indicated, is zero when the vehicle is following the desired offset path.

The guide or steering signal may be simply displayed on the dashboard of a vehicle, such as a motorcar, to indicate to the driver how the vehicle should be steered to keep it following the desired offset path, or alternatively, the guide or steering signal may be fed to a steering servo mechanism which operates automatically to cause the vehicle to follow the desired offset path.

The guide signals of frequency $f_1$ detected by the respective coils 4 and 5 are fed via amplifiers 17 and 10 and filters 18 and 19, which are arranged to pass the specific frequency $f_1$ of the guide signal, to rectifier circuits 20 and 21 from which a rectified signal is present in lines 22 and 23 when the guide signal of frequency $f_1$ is being detected by the respective coils 4 and 5. The lines 22 and 23 are connected to two of the four inputs to an AND logic element 24.

Two filters 25 and 26 designed to pass respectively frequencies $f_2 - f_1$ and $f_3 - f_1$ are connected to the output of the comparator device 9. Consequently the selected difference frequencies $f_2 - f_1$ and $f_3 - f_1$ are fed to respective rectifier circuits 27 and 28 and rectified signals are present on lines 29 and 30 so long as both the signals $f_2 - f_1$ and $f_3 - f_1$ respectively are present in the output of the comparator device 9. The lines 29 and 30 constitute the other two inputs to the AND logic element 24.

Provided that there is an induced signal in each of the coils 4 and 5 and the comparator device 9 is functioning and giving an output signal (irrespective of whether this output signal has a zero steady component indicating that the vehicle is following the desired offset path or the value of this signal is not zero indicating that the vehicle has deviated from the desired offset path), there will be a signal present on each of the four input lines 22, 29, 30 and 23 of the AND logic element 24, and this AND logic element 24 will give a normal output indicating that all the components of the guidance system are operating satisfactorily. However, if there should be a failure of any component in the system, this will result in a failure in one of the inputs 22, 29, 30 and 23 with the result that the AND logic element 24 will give the output opposite to the normal output condition, and this is a warning signal which is preferably employed to ensure that the vehicle is brought to rest and no damage can be sustained as a result of the failure. The AND logic element 24 is itself preferably of an inherently safe kind, for example a laddic logic element.

Specifically, if there is a failure in the transmission of the guide signal of frequency $f_1$, then all the four inputs to the AND logic element 24 will fail so that, after the warning signal, this condition of a failure in the transmitted signal is readily recognized.

The four inputs 22, 29, 30 and 23 to the AND logic element 24 provide checks on various parts of the reception means and comparison circuitry on the vehicle. The presence of a rectified signal on the inputs 22 and 23 of the AND logic element 24 indicates respectively that the coils 4 and 5 are each functioning satisfactorily, and the presence of the signal on the input line 23 also confirms that the amplifier 10 and the filter 19 are operating, and the reference signal is applied to the phase-sensitive detector which is the comparator device 9.

The presence of rectified signals on input lines 29 and 30 both confirm that the portion of the circuit from the point 6 through line 7, amplifier 8 and the comparator device 9 is working, while individually the input present on line 29 confirms that the coil 4 and resistor 13 are operating and the input present on line 30 confirms that the coil 5 and the resistor 14 are both working.

In the event of a warning being given by a change in the output condition of the AND logic element 24, it is possible, from an examination of the four inputs to the AND logic element 24, to identify in which part of the system or the circuit which comprises the reception means the failure has occurred. FIG. 2 therefore provides in one embodiment the fullest possible circuit for giving a warning in the event of a failure in any part of the system.

Referring to FIG. 3, there is shown another embodiment in which the coils 4 and 5 are connected to the amplifier 8 and thence to the comparator device 9 through a continually oscillating switch contact 31 which may be, for example, a relay contact or a semiconductor switch. As the switch contact 31 moves between its two positions it connects the signal induced in the coils 4 and 5 alternately to the amplifier 8 and thence to the input of the comparator device 9.

Consequently the output from the comparator device 9 is an electrical signal alternating between values corresponding to the voltages induced in the coils 4 and 5, so that the output signal from the comparator device 9 will have a steady component, which is zero when the vehicle is following the desired offset path a predetermined distance from the leader cable 1, and a definite positive or negative amplitude when the vehicle has deviated from the desired offset path, the sign of this signal being dependent upon the direction of deviation. Superposed on this steady signal at all times is a signal at the frequency of operation of the switch contact 31.

In the embodiment of FIG. 3, as in the embodiment of FIG. 2, the low pass filter 15 passes the steady or direct current component of the output signal from the comparator device 9 to an output line 16 as the steering signal which is indicative of the relationship of the coils 4 and 5 to the desired offset path.

In the embodiment of FIG. 3 three inputs only are provided to an AND logic element 32, these being inputs on lines 22 and 23, checking the satisfactory operation of the coils 4 and 5, and an input based on the alternating component of the output signal from the comparator device 9 and extracted from that output by a received circuit 33, is applied via line 34 to the third input of the AND logic element 32. The presence of the input on the line 34 confirms that the amplifier 8 and comparator device 9 are functioning correctly.

The circuit of FIG. 3 is therefore also a full check on all the elements in the reception means on the vehicle as well as in the transmission of the leader cable 1.

In FIG. 4 of the accompanying drawings there is shown a circuit which is a simplified version of the circuit of FIG. 2 and which provides an indication to an AND logic element 35 by two inputs only 22 and 23 that the guide signal of frequency $f_1$ is being received in both the coils 4 and 5. In designing this circuit it is assumed that the components, which are resistors 13 and 14, the amplifier 8 and the comparator device 9, are reliable components which do not require checking.

It will readily be appreciated that the output signals which are derived from the coils 4 and 5 are applied to the AND logic elements in the various embodiments via lines 22 and 23 and the output signals corresponding to the strength of the received guide signal and the output signal from the comparator device 9, which is obtained from the lowpass filter 15. In each embodiment a signal is derived from a comparison of the strength of the received guide signal and a spacial gradient of the received guide signal which indicates uniquely the relationship of the vehicle to the desired offset path. In the embodiments of FIGS. 2 and 4 the steering signal is effectively produced at the point 6, whereas in FIG. 3 the steering signal is not produced until the line 16 which is the output from the lowpass filter 15.

Referring generally to guide systems, when the guide member is substantially straight, measurement of the vectorial distance of the vehicle from the guide member determines by itself the present position of the vehicle, whereas measurement of the scaler distance shows the vehicle to be on the surface of an imaginary cylinder drawn with the guide member as principal axis and of radius equal to the measured scalar distance. By use of two or more guide members, the complete path or position of the vehicle can be determined by well known geometrical principles, this determination being practically unambiguous because, although mathematically two cylinders may intersect in a pair of lines, one of these will be excluded from consideration by practical considerations, for example one such line may lie underground. Where the vehicle consists of a land or water vehicle or an aircraft taxiing, the intersection of the plane in which the vehicle maneuvers along the ground with the imaginary cylinder defined by measurement of scalar distance from a single guide member, as previously described, completely determines the path of the vehicle except for the ambiguity that it may lie on either of two lines at equal distances on either side of a guide member laid on or substantially parallel to the ground. Such ambiguity may be resolved by use of a second guide member displaced a convenient distance from the first, or by determination of the sign of the vector distance resolved along a convenient direction, for example in the plane of the ground. The embodiments of the invention which have been described inherently include this determination of sign. It is to be understood that all these considerations continue to apply mutatis mutandis when the guide member is not straight. It is further to be understood that for land or water vehicles or for aircraft taxiing the vector or scalar distance can be chosen so that the vehicle follows a path offset by a prescribed amount horizontally from the guide member, zero horizontal offset being simply a special case requiring no essential change in the sensor.

The advantages of the system in accordance with the present invention as compared with previous vehicle guidance systems are that the steering signal is insensitive to variations in strength of the guide signal for any offset path from the leader cable 1 and, because the strength of the guide signal is known unambiguously at the vehicle, the system can be made a fail-safe system at any offset path from the leader cable 1.

We claim:

1. In a system operable for guiding a vehicle in a desired path in generally parallel relation to and spaced a predetermined substantial offset distance from a predetermined plane, first means arranged for mounting on the vehicle, second means including an elongated guide in said predetermined plane and in generally parallel relation to said desired path, said first and second means being arranged for signal transmission therebetween with one of said first and second means including signal emitter means and the other including reception means operative to develop first and second signals having strength which vary with the distance between said first and second means according to different functions, said different functions being such that an algebraic summation in which said first and second signals are applied in opposed relation is of one effective polarity when the distance between said first means and said predetermined plane is greater than said predetermined substantial offset distance, of an opposite effective polarity when the distance between said first means and said predetermined plane is less than said predetermined substantial offset distance and zero when the distance between said first means and said predetermined plane is equal to said predetermined substantial offset distance, and comparison means for comparing the strength of said first and second signals to develop a steering signal which indicates uniquely the spatial relationship of the vehicle to said predetermined plane, said comparison means being responsive to said algebraic summation and being effective to develop a steering signal of one effective polarity when the distance between said first means and said predetermined plane is greater than said predetermined substantial offset distance and of an opposite effective polarity when the distance between said first means and said predetermined plane is less than said predetermined substantial offset distance.

2. In a system as defined in claim 1, said reception means including first and second sensing means for developing said first and second signals and positioned at different distances from said emitter means, the distance from said emitter means to said first sensing means being less than the distance from said emitter means to said second means, and said first sensing means having an effective sensitivity less than that of said second sensing means.

3. In a system as defined in claim 2, said reception means being associated with said first means and being mounted on said vehicle and said emitter means being associated with said second means and including an elongated cable forming said elongated guide and energized to develop an alternating electromagnetic field of a certain frequency, the intensity of said field being a function of the distance from said predetermined plane and the direction of said field at said reception means being generally parallel to said predetermined plane, said first and second sensing means comprising first and second coils on spaced axes generally parallel to each other and to said predetermined plane.

4. In a system as defined in claim 3, said vehicle being movable in said desired path in a horizontal direction on a generally horizontal support surface and said elongated cable being horizontal and in proximity to said surface, said predetermined plane being vertical and said first and second coils having generally vertical axes.

5. In a system as defined in claim 3, said comparison means comprising a phase sensitive detector, means for applying said first and second signals in phase opposition to said phase sensitive detector, and means responsive to at least one of said first and second signals to apply a reference signal to said phase sensitive detector.

6. In a system as defined in claim 5, means for applying a pair of test signals to said coils at a pair of frequencies differing from each other and from said certain frequency, and means for responding to the absence of difference frequency components at the output of said phase sensitive detector to indicate malfunction of the system.

7. In a system as defined in claim 1, means including logic circuitry for responding to the absence of either of said first and second signals to indicate malfunction of the system.

8. In a system as defined in claim 1, said emitter means being operative for developing an electromagnetic field along said elongated guide, and said reception means being operative to measure the gradient of said electromagnetic field.

* * * * *